(12) United States Patent
Shaffer

(10) Patent No.: US 9,403,125 B2
(45) Date of Patent: Aug. 2, 2016

(54) VALVE WITH AIR-GAP PROVISION TO PREVENT BACKFLOW

(71) Applicant: General Electric Company, Schenectady, NY (US)

(72) Inventor: Timothy Scott Shaffer, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 248 days.

(21) Appl. No.: 14/048,122

(22) Filed: Oct. 8, 2013

(65) Prior Publication Data

US 2015/0096635 A1    Apr. 9, 2015

(51) Int. Cl.
*B01D 61/10* (2006.01)
*F16K 11/087* (2006.01)

(52) U.S. Cl.
CPC ............. *B01D 61/10* (2013.01); *F16K 11/0876* (2013.01); *B01D 2313/18* (2013.01); *Y10T 137/86871* (2015.04)

(58) Field of Classification Search
CPC .................................................... F16K 11/0876

USPC .......... 137/625.46, 625.47, 625.41, 216, 217, 137/218
See application file for complete search history.

(56) References Cited

U.S. PATENT DOCUMENTS

| 4,210,533 A | 7/1980 | Astl |
| 5,701,926 A * | 12/1997 | Luisi ......................... E03C 1/04 137/218 |
| 7,550,084 B2 | 6/2009 | Schmitt |
| 2006/0076056 A1* | 4/2006 | Schmitt .................. B01D 61/10 137/216 |

* cited by examiner

*Primary Examiner* — John K Fristoe, Jr.
*Assistant Examiner* — Paul Gray
(74) *Attorney, Agent, or Firm* — Dority & Manning, P.A.

(57) ABSTRACT

A valve is provided having an air gap to protect against backflow in a fluid system. The valve can also be used to control fluid flow while providing such backflow protection. The valve can be used with e.g., a reverse osmosis water filtration system and/or other systems. By incorporating both backflow protection and flow control into the same device, efficiencies in space, complexity, and/or installation time are provided.

20 Claims, 6 Drawing Sheets

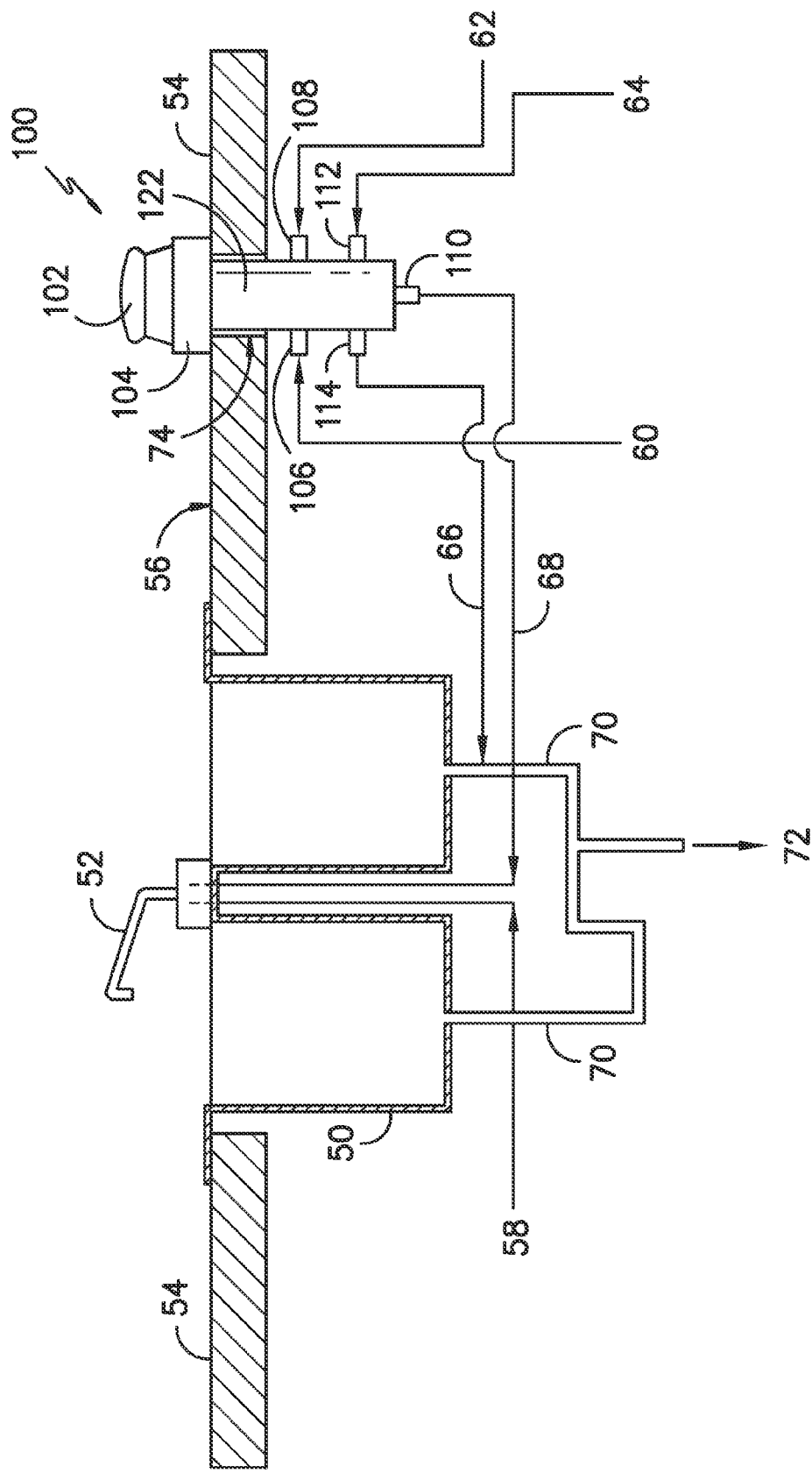
FIG. -1-

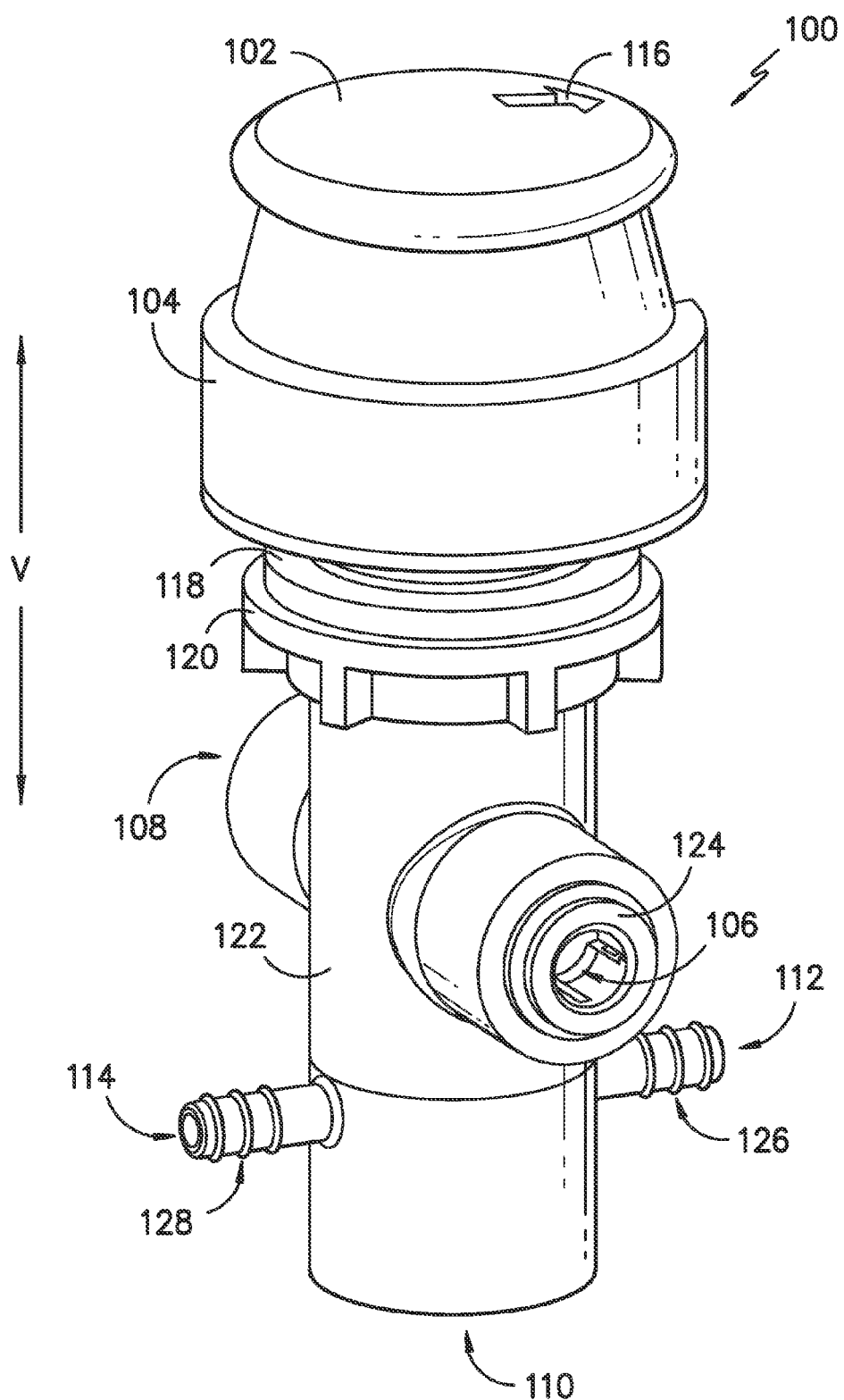
FIG. -2-

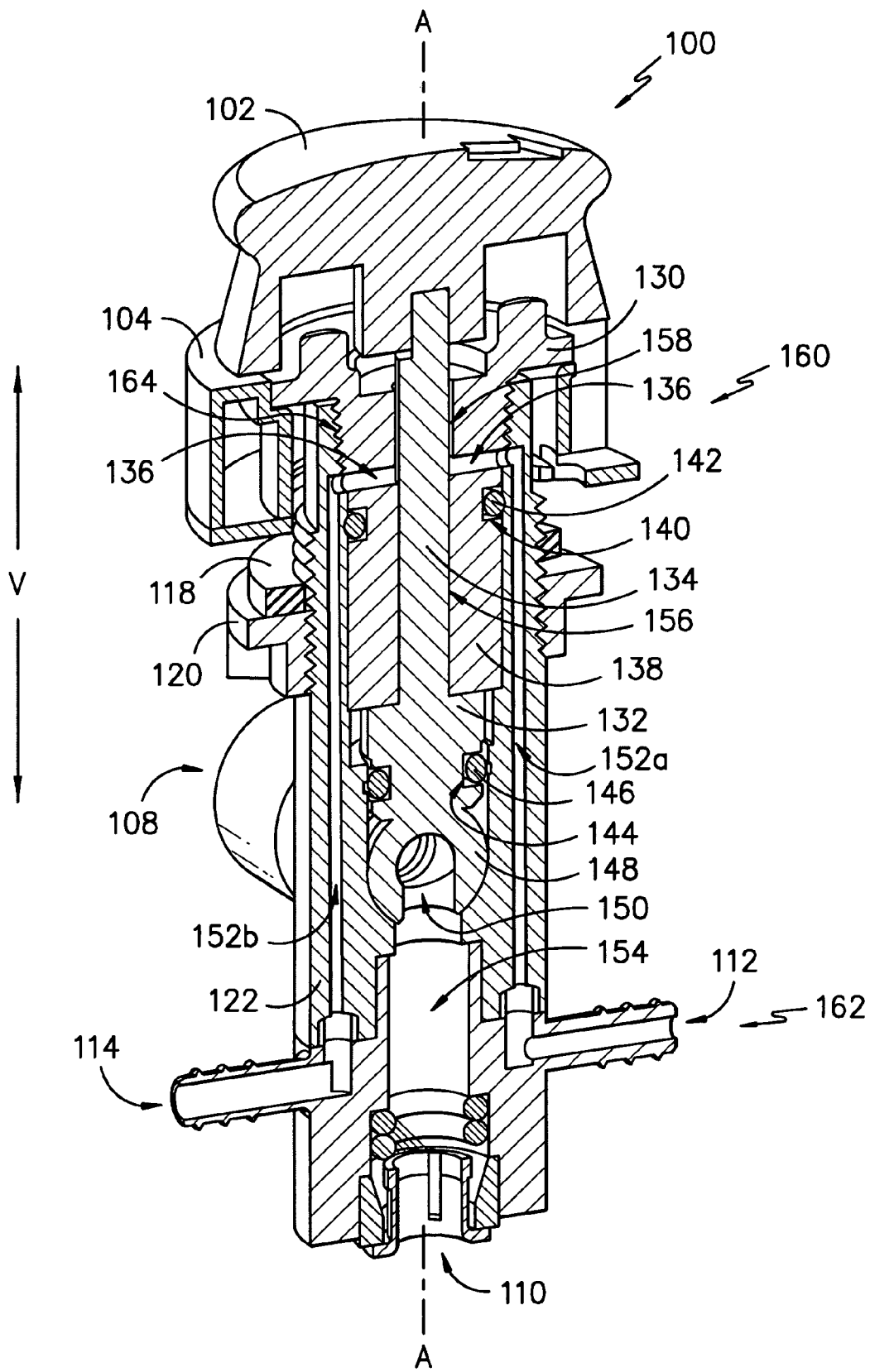
FIG. -3-

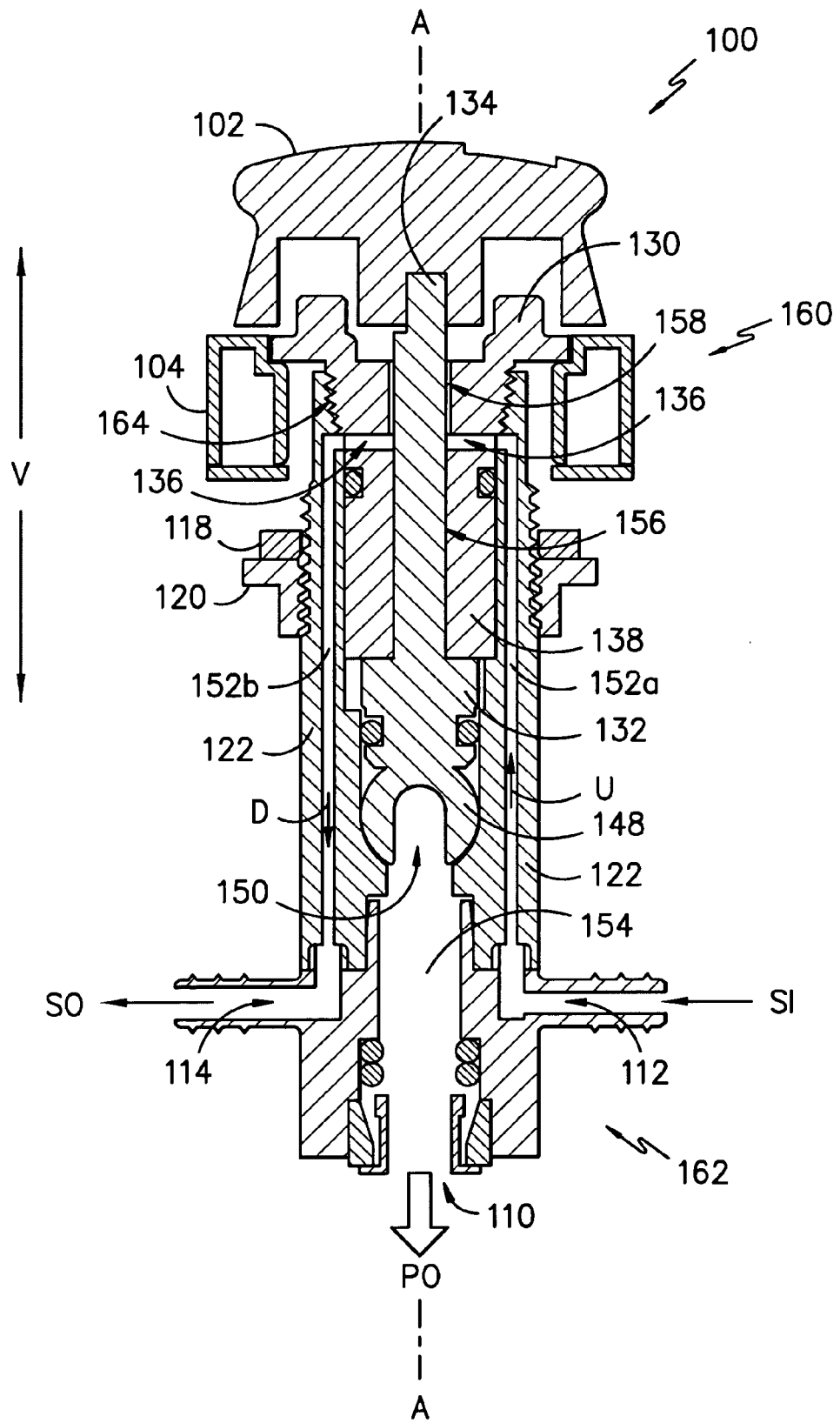
FIG. —4—

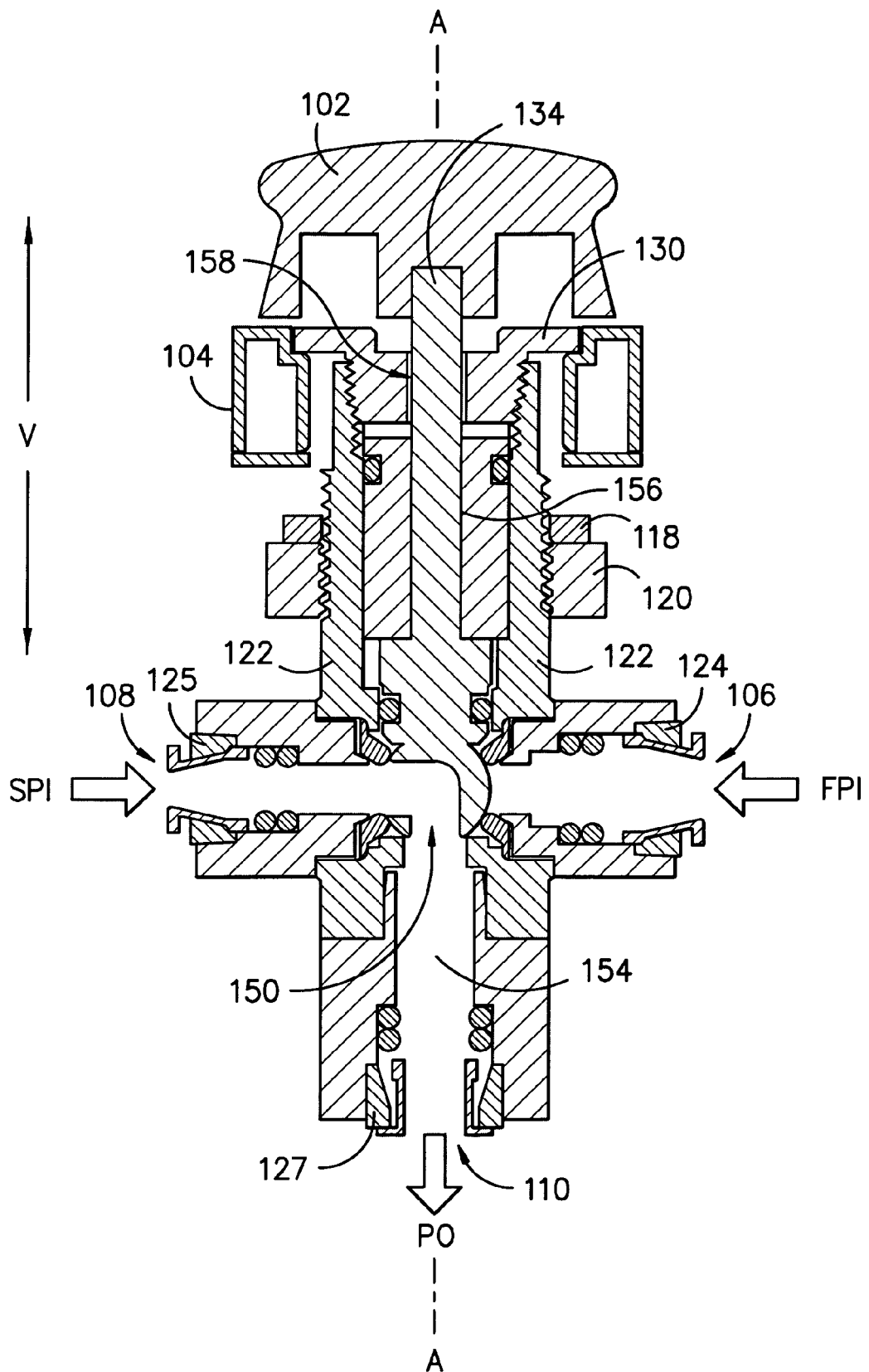
FIG. -5-

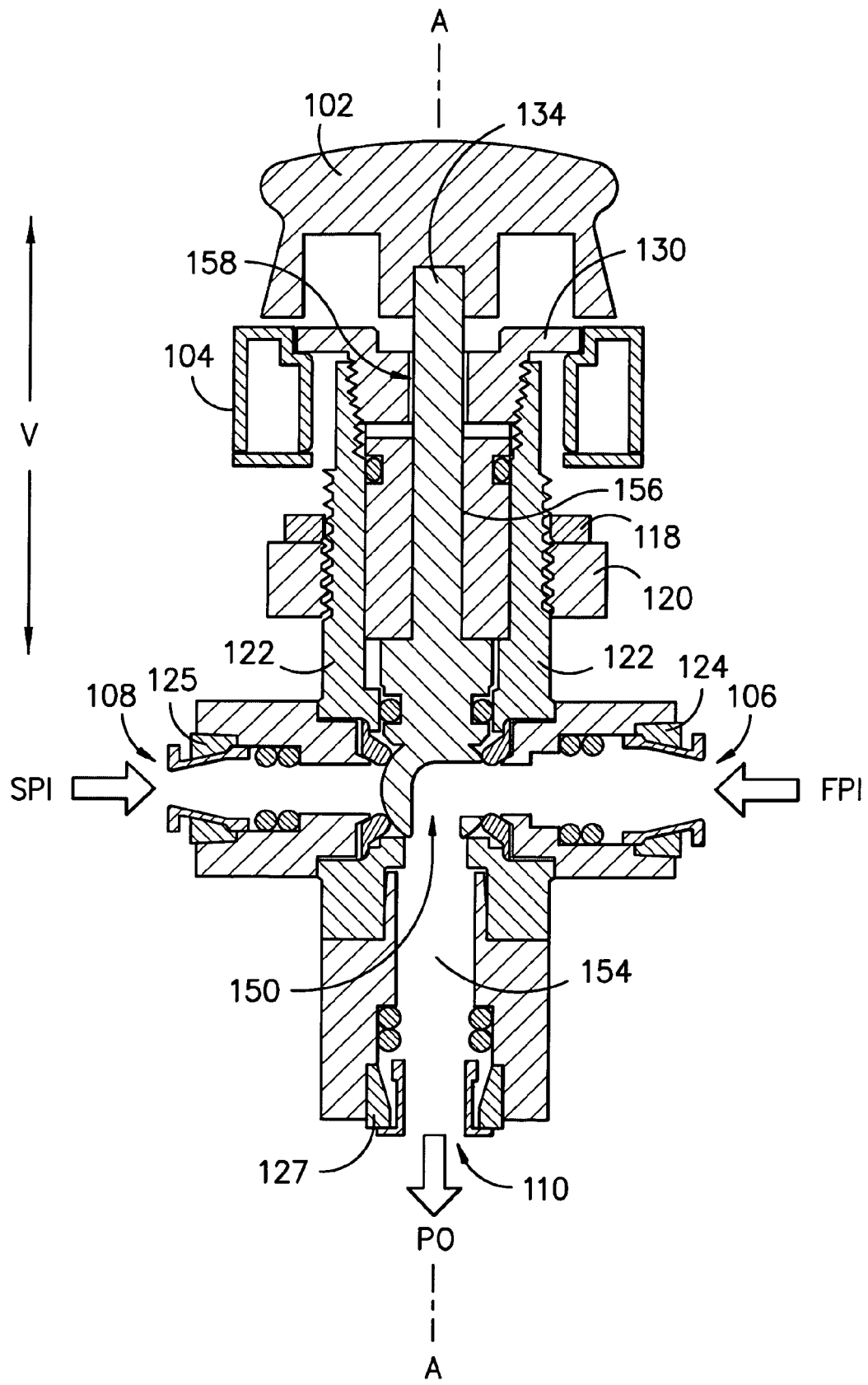
FIG. -6-

VALVE WITH AIR-GAP PROVISION TO PREVENT BACKFLOW

FIELD OF THE INVENTION

The subject matter of the present disclosure relates generally to a valve or diverter that provides an air gap or break to protect against backflow.

BACKGROUND OF THE INVENTION

Certain fluid systems can require protection against backflow from e.g., a drainage or sewage system. For example, a dishwashing appliance is typically connected to a drain line leading to a sewage system for allowing wastewater from cleaning operations to be fed to the sewage system. However, under certain conditions, waste fluid may attempt to backflow undesirably from the sewage system into the drain line and into the dishwashing appliance. By way of additional example, certain water filtration systems—such as reverse osmosis systems—may create wastewater that is fed to a drainage or sewage system. This waste or reject water contains contaminants filtered from the water. The backflow of this wastewater from the sewage system to the water filtration system is also undesirable. Accordingly, with these and other applications, it is desirable to provide protection against such backflow. Building codes and other government regulations may require that such protection be provided.

One device that can be used to prevent backflow is a check valve. A common construction uses a spring that forces a ball or other element against a port to seal off backflow through the port. When fluid flows in the proper direction, it pushes the ball and compresses the spring, thereby allowing fluid to flow through the port. However, if fluid attempts to backflow through the port, the flow is in the same direction of action as the spring, and the fluid and spring act together to force the ball against the port and thereby prevent such backflow.

A check valve can lose its ability to operate correctly due to e.g., hysteresis of the spring. In addition, the check valve is typically an additional, separate element that must be installed in a fluid system, thereby adding to the overall complexity and expense. As an additional item, the check valve will also consume additional space. For certain applications, such as a kitchen sink or within cabinetry, such additional space may be unavailable or its use for a check valve or other backflow prevention device may be undesirable.

Accordingly, a device for protecting against backflow in a fluid system would be desirable. More particularly, a device that can protect against backflow and that can be incorporated within a valve to provide additional functionality and space savings would be beneficial.

BRIEF DESCRIPTION OF THE INVENTION

The present invention provides a valve that provides an air gap or break to protect against backflow in a fluid system. The valve can also be used to control fluid flow while still providing such backflow protection. The valve can be used with e.g., a reverse osmosis water filtration system and/or other systems. By incorporating both backflow protection and flow control into the same device, efficiencies in space, complexity, and/or installation time are provided. Additional aspects and advantages of the invention will be set forth in part in the following description, or may be apparent from the description, or may be learned through practice of the invention.

In one exemplary embodiment, the present invention provides a valve for preventing backflow. The valve includes a main body having a first primary inlet; a primary outlet; a secondary inlet; a secondary outlet; and a secondary fluid channel connecting the secondary inlet with the secondary outlet, the secondary fluid channel defining a gap connected with an ambient that is exterior to the valve. The valve also includes a rotatable valve element positioned within the main body. The valve element is selectively rotatable between a position placing the first primary inlet in fluid communication with the primary outlet, and a position disconnecting the first primary inlet from fluid communication with the primary outlet.

In still another exemplary embodiment, the present invention provides a diverter valve that includes a cylindrical main body having a longitudinal axis extending along a vertical direction when the valve is mounted. The main body includes a first primary inlet; a primary outlet; a secondary inlet; a secondary outlet; and a secondary fluid channel continuously connecting the secondary inlet with the secondary outlet. The secondary fluid channel defines a gap that is in fluid communication with an ambient exterior to the valve and is located along a flow direction of the fluid channel that is between the secondary inlet and the secondary outlet and above the secondary inlet and the secondary outlet along the vertical direction. A valve element is positioned within the main body. The valve element is selectively movable between a first position placing the first primary inlet in fluid communication with the primary outlet and a second position disconnecting the first primary inlet from fluid communication with the primary outlet.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a cross-sectional view of an example of a kitchen countertop onto which an exemplary diverter valve of the present invention is mounted.

FIG. 2 is a perspective view of an exemplary diverter valve of the present invention.

FIG. 3 is a perspective and cross-sectional view of the exemplary diverter valve of FIG. 2.

FIG. 4 is a cross-sectional view of the exemplary diverter valve of FIG. 2 with the cross-section taken along the same plane as FIG. 3.

FIG. 5 is another cross-sectional view of the exemplary diverter valve of FIGS. 2 and 3. The cross-sectional plane of FIG. 5 is orthogonal to the cross-sectional plane of FIG. 4.

FIG. 6 is a cross-sectional view taken along the same plane as FIG. 5 but showing the valve element in a different position than in FIG. 5.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides an example of an application of an exemplary embodiment of a diverter valve 100 for preventing backflow. More particularly, FIG. 1 is a cross-sectional view of a kitchen sink 50 and countertop 54. Diverter valve 100 is mounted onto countertop 54. A dial on handle 102 is visible to the user above top surface 56 of countertop 54 while a main body 122 of valve 100 extends through an opening 74 in countertop 54. A kitchen application is provided by way of example only; diverter valve 100 may be used in other applications as well.

Kitchen sink 50 includes a faucet 52 that is connected with (or in fluid communication with) a hot water supply 58 and a cold water supply 68. Sink 50 is also connected with drain lines 70 that feed waste fluids (i.e., water that may contain foods, soils, etc.) to a drain or sewage 72. For example, sewage 72 could lead to a septic tank or to a sewage pipe connected with a municipal waste treatment station.

Diverter valve 100 allows a selection of water for supply line 68. More particularly, and by way of example, line 60 provides unfiltered water to a first primary inlet 106 of diverter valve 100 while line 62 provides filtered water to a second primary inlet 108 of diverter valve 100. By rotating handle 102, a user can select whether filtered or unfiltered water will be provided to faucet 52 at sink 50. As will be more fully described, the rotation of handle 102 can be used to place either line 60 or line 62 into fluid communication with the primary outlet 110 of diverter valve 100 and thereby provide filtered or unfiltered water through line 68 to faucet 52 as selected by a user. As shown, primary outlet 110 is connected with line 68. A retaining nut 120 (FIG. 2) helps secure diverter valve 100 to countertop 54 and a seal 118 (FIG. 2) can be used to prevent fluids on the surface 56 of countertop 54 from leaking below countertop 54.

In addition, the present invention allows exemplary diverter valve 100 to provide an air-gap or break feature to help prevent fluid backflow. For example, the filtered water line 62 may represent a filtered water supply provided by a reverse osmosis unit. Such units typically create a reject or concentrate flow of water that carries away contaminants or other undesirable substances filtered out of the water to create a permeate or filtered water supply 62. Accordingly, line 64 provides for a flow of reject water or reject fluid that is fed through diverter valve 100 by connection to a secondary inlet 112. The reject fluid exits diverter valve 100 by a secondary outlet 114 to line 66 that, in turn, provides the reject fluid to drain 70 for delivery to sewage 72. As will be understood by one of skill in the art, lines 58, 60, 62, 64, 68, 60, and 72 represent e.g., piping, tubing, or other means for fluid flow.

To prevent a backflow or siphoning that could cause sewage to backflow from sewage 72 and ultimately back into line 62 to potentially contaminate the filtering system, diverter valve 100 provides the additional functionality of an air gap or air break. The gap is in communication with the ambient—i.e., with the atmosphere surrounding valve 100—to prevent a vacuum, low pressure, or other conditions conducive to a backflow from sewage 72. A more detailed description of the construction and operation of exemplary valve 100 will now be provided.

Referring now to FIGS. 1 and 2, diverter valve 100 includes a display manifold 104 that contacts top surface 56 of countertop 54. Indicia 116 provided on handle 102 can be used to visually denote the position or state of valve 100. A variety of connection types may be used to connect valve 100 with the various lines—i.e., pipes and/or tubing depicted in FIG. 1. For this exemplary embodiment, diverter valve 100 is equipped with quick disconnect type connectors 124, 125, and 127 (FIGS. 5 and 6) for first primary inlet 106, second primary inlet 108, and primary outlet 110, respectively. Ribbed connectors 126 and 128 are provided for secondary inlet 112 and secondary outlet 114, respectively. However, these connectors are each provided by way of example only and other connection types may be used.

Referring now to FIGS. 3 and 4, diverter valve 100 includes a cylindrically-shaped main body 122 that includes first primary inlet 106, second primary inlet 108, primary outlet 110, secondary inlet 112, and secondary outlet 114. As used herein, "primary" refers to flow manipulated by the user while "secondary" refers to flow for which backflow prevention is provided. Main body 122 also includes a secondary fluid channel 152 that connects the secondary inlet 112 with the secondary outlet 114.

More particularly, secondary fluid channel 152 includes a first portion 152a and a second portion 152b connected by an air break or air gap 136. Main body 122 extends longitudinally along a vertical axis A-A between an upper end 160 and a lower end 162. Gap 136 is positioned near the upper end 160 while secondary inlet 112 and secondary outlet 114 are positioned near the lower end 162. Thus, gap 136 is elevated along vertical axis A-A-relative to secondary inlet 112 and secondary outlet 114, which are positioned below gap 136. For this exemplary embodiment, first portion 152a and second portion 152b of secondary fluid channel 152 each extend through main body 122 in a substantially parallel manner to vertical axis A-A.

Gap 136 is communication with—i.e., connected with—the ambient that is exterior to diverter valve 100. Continuing with FIGS. 3 and 4, diverter valve 100 includes a rotatable valve element 132 received within main body 122. Valve element 132 includes a valve stem 134 that extends through gap 136 and a display retaining nut 130, which is used to help secure display manifold 104 and diverter valve 100 to countertop 54. The tolerance between valve stem 134 and display retaining nut 130 provides a small opening 158 through which gap 136 is in communication with the ambient exterior to diverter valve 100. A similar opening can be provided through threads 164 where display retaining nut 130 is connected into the upper end 160 of main body 122. At the same time, the tolerance is sufficient to prevent low pressure fluid flow through secondary fluid channel 152 from leaking.

Accordingly, fluid can travel into secondary fluid inlet 112 (flow arrow SI), move upward vertically along first portion 152a of fluid channel 152 (flow arrow U), and into gap 136. From gap 136, fluid can travel downward vertically through second portion 152b of fluid channel 152 (flow arrow D) and exit diverter valve 100 through secondary outlet 114 (flow arrow SO). Because gap 136 is continuously in fluid communication with the ambient, gap 136 helps prevent the formation of a vacuum or other conditions that could lead to a backflow through line 66 from sewage 72. For this exemplary embodiment, gap 136 is formed between a plug 138 received into main body 122 and display retaining nut 130. However, other constructions may be used to provide gap 136 along the secondary fluid channel 152.

At the same time, diverter valve 100 provides additional functionality in allowing a user to control or select fluid flow through valve 100. Referring now to FIGS. 5 and 6, stem 134 at a top end of rotatable valve element 132 passes through an opening 156 in plug 138 and through nut 130 to connect with dial or handle 102. At the other end, rotatable valve element 132 includes a ball 148 defining a groove or slot 150. Thus, the rotation of handle 102 also rotates valve element 132 to control the orientation of slot 150.

Accordingly, in FIG. 6, valve element 132 has been selectively rotated into a first position placing the first primary inlet 106 into fluid communication with the primary outlet 110. As such, unfiltered fluid may flow in through first primary inlet 106 (flow arrow FPI), pass through primary fluid channel 154 defined by main body 122, and exit through primary outlet 110 to travel to faucet 52 though line 68 (FIG. 1).

In FIG. 5, valve element 132 has been selectively rotated into a second position that disconnects the first primary inlet 106 from fluid communication with the primary outlet 110. For this exemplary embodiment of valve 100, in the second position, the second primary inlet 108 is placed into fluid communication with the primary outlet 110. As such, filtered fluid may flow into valve 100 through second primary inlet 108 (flow arrow SPI), pass through primary fluid channel 154, and exit valve 100 through primary outlet 110 to travel to faucet 52 though line 68 (FIG. 1). In an alternative embodiment of the present invention, the second position would simply disconnect the first fluid inlet 106 and the primary outlet 110, and valve element 132 is rotatable between such positions. Other configurations may be used as well.

Referring now to FIG. 3, valve element 132 defines a plurality of grooves 140 and 144 equipped with o-rings or seals 142 and 146, respectively, to prevent fluid from primary fluid channel 154 from leaking into other parts of valve 100. However, the present invention is not limited to the particular shape or configuration of valve element 132 and others may be used as well.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A valve for preventing backflow, comprising:
   a main body comprising
      a first primary inlet,
      a primary outlet,
      a secondary inlet,
      a secondary outlet, and
      a secondary fluid channel connecting the secondary inlet with the secondary outlet, the secondary fluid channel defining a gap connected with an ambient that is exterior to the valve; and
   a rotatable valve element positioned within the main body, the valve element at least partially positioned in the secondary fluid channel and selectively rotatable between a position placing the first primary inlet in fluid communication with the primary outlet and a position disconnecting the first primary inlet from fluid communication with the primary outlet;
   wherein the main body extends longitudinally along a vertical axis between an upper end and a lower end, and wherein the gap is located at a position that is higher along the vertical axis than the secondary inlet and the secondary outlet.

2. The valve of claim 1, wherein the main body extends longitudinally along a vertical axis between an upper end and a lower end, and wherein the gap is positioned near the upper end.

3. The valve of claim 1, wherein the secondary fluid channel comprises a first portion and a second portion extending substantially parallel to the vertical axis, wherein the first portion and second portion are connected by the gap.

4. The valve of claim 1, wherein the secondary fluid channel comprises a first portion and a second portion extending substantially parallel to the vertical axis, wherein the first portion and second portion are connected by the gap that is positioned near the upper end.

5. The valve of claim 4, wherein the secondary inlet and the secondary outlet are positioned below the gap.

6. The valve of claim 1, wherein the rotatable valve element comprises a valve stem extending through the main body, and wherein the gap is connected with the ambient through an opening that extends along the valve stem.

7. The valve of claim 6, further comprising a plug positioned within the main body and defining an aperture through which the valve stem extends.

8. The valve of claim 1, wherein the main body further comprises a second primary inlet, and wherein the rotatable valve is selectively rotatable between the position placing the first primary inlet in fluid communication with the primary outlet and a position placing the second primary inlet in fluid communication with the primary outlet that also disconnects the first primary inlet from fluid communication with the primary outlet.

9. The valve of claim 1, wherein the first primary inlet is connected with a water supply.

10. The valve of claim 1, wherein the secondary outlet is fluidly connected to a drain line.

11. The valve of claim 1, wherein the secondary inlet is fluidly connected to the fluid reject line of a reverse osmosis water filtration system.

12. A diverter valve, comprising:
   a cylindrical main body having a longitudinal axis extending along a vertical direction when the valve is mounted, the main body comprising
      a first primary inlet,
      a primary outlet,
      a secondary inlet,
      a secondary outlet, and
      a secondary fluid channel continuously connecting the secondary inlet with the secondary outlet, the secondary fluid channel defining a gap that is in fluid communication with an ambient exterior to the valve and is located along a flow direction of the fluid channel that is between the secondary inlet and the secondary outlet and above the secondary inlet and the secondary outlet along the vertical direction; and
   a valve element positioned within the main body, the valve element at least partially positioned in the secondary fluid channel and selectively movable between a first position placing the first primary inlet in fluid communication with the primary outlet and a second position disconnecting the first primary inlet from fluid communication with the primary outlet;
   wherein the gap is located at a position that is higher along the longitudinal axis than the secondary inlet and the secondary outlet.

13. The diverter valve of claim 12, wherein the secondary fluid channel comprises a first portion and a second portion extending substantially parallel to the vertical axis, wherein the first portion and second portion are connected by the gap.

14. The diverter valve of claim 12, wherein the valve element comprises a valve stem extending through the main body, and wherein the gap is in fluid communication with the ambient through an opening that extends along the valve stem.

15. The diverter valve of claim 12, further comprising a plug positioned within the main body and defining an aperture through which the valve stem extends.

16. The diverter valve of claim 15, wherein the gap is located above the plug.

17. The diverter valve of claim 12, wherein the main body further comprises a second primary inlet, and wherein the valve element is selectively movable between the first position placing the first primary inlet in fluid communication with the primary outlet and the second position placing the second primary inlet in fluid communication with the primary outlet and disconnecting the first primary inlet from fluid communication with the primary outlet.

18. The diverter valve of claim 12, wherein the secondary outlet is fluidly connected to a drain line.

19. The diverter valve of claim 18, wherein the secondary inlet is fluidly connected to the fluid reject line of a reverse osmosis water filtration system.

20. A valve for preventing backflow, comprising:
a main body comprising
 a first primary inlet,
 a primary outlet,
 a secondary inlet,
 a secondary outlet, and
 a secondary fluid channel connecting the secondary inlet with the secondary outlet, the secondary fluid channel defining a gap connected with an ambient that is exterior to the valve; and
a rotatable valve element positioned within the main body, the valve element at least partially positioned in the secondary fluid channel and selectively rotatable between a position placing the first primary inlet in fluid communication with the primary outlet and a position disconnecting the first primary inlet from fluid communication with the primary outlet;
wherein the secondary inlet is fluidly connected to the fluid reject line of a reverse osmosis water filtration system.

* * * * *